(12) United States Patent
Eijsbouts-Spickova et al.

(10) Patent No.: US 8,394,263 B2
(45) Date of Patent: Mar. 12, 2013

(54) BULK CATALYST COMPRISING METAL OXIDIC PARTICLES AND A PROCESS FOR THE MANUFACTURE THEREOF

(75) Inventors: Sona Eijsbouts-Spickova, Nieuwkuijk (NL); Robertus Gerardus Leliveld, Utrecht (NL); Stuart Leon Soled, Pittstown, NJ (US); Sabato Miseo, Pittstown, NJ (US)

(73) Assignee: Albemarle Netherlands B.V., Baton Rouge, LA (US)

( * ) Notice: Subject to any disclaimer, the term of this patent is extended or adjusted under 35 U.S.C. 154(b) by 707 days.

(21) Appl. No.: 12/091,327

(22) PCT Filed: Oct. 25, 2006

(86) PCT No.: PCT/EP2006/010302
§ 371 (c)(1),
(2), (4) Date: Dec. 2, 2008

(87) PCT Pub. No.: WO2007/048600
PCT Pub. Date: May 3, 2007

(65) Prior Publication Data
US 2009/0211945 A1    Aug. 27, 2009

Related U.S. Application Data

(60) Provisional application No. 60/730,911, filed on Oct. 26, 2005.

(30) Foreign Application Priority Data

Jan. 25, 2006  (EP) ..................... 06100803

(51) Int. Cl.
*B01J 23/755* (2006.01)
(52) U.S. Cl. .................. 208/244; 208/208 R; 208/213; 208/216 R; 208/243; 502/305; 502/313
(58) Field of Classification Search ............. 208/208 R, 208/213, 216 R, 243–244, 249; 502/305, 502/313, 315
See application file for complete search history.

(56) References Cited

U.S. PATENT DOCUMENTS

| 2,642,463 | A | | 6/1953 | Arnold et al. |
| 3,779,903 | A | * | 12/1973 | Levinson .................. 208/254 H |
| 5,275,994 | A | | 1/1994 | Weissman et al. |
| 6,402,936 | B1 | | 6/2002 | Benazzi et al. |
| 6,620,313 | B1 | * | 9/2003 | Demmin et al. .............. 208/112 |
| 6,635,599 | B1 | | 10/2003 | Eijsbouts et al. |
| 2003/0102254 | A1 | | 6/2003 | Eijsbouts et al. |
| 2004/0182749 | A1 | | 9/2004 | Domokos et al. |
| 2004/0235653 | A1 | | 11/2004 | Domokos et al. |

FOREIGN PATENT DOCUMENTS

| WO | WO 99/03578 A1 | 1/1999 |
| WO | WO 00/41810 A1 | 7/2000 |
| WO | WO 2005/105958 A1 | 11/2005 |
| WO | WO 2005/105959 A1 | 11/2005 |

* cited by examiner

*Primary Examiner* — Brian McCaig
(74) *Attorney, Agent, or Firm* — Jeremy J. Kliebert; Marcy M. Hoefling; James A. Jubinsky

(57) ABSTRACT

The invention relates to a bulk catalyst having improved activity in hydrodesulphurization, in particular in relatively low Group VIII over Group VIB metal molar ratios. The bulk catalyst comprises metal oxidic particles comprising one or more Group VIB metals and one or more-Group VIII metals which metal oxidic particles are obtainable by a process comprising the steps of reacting the compounds comprising one or more Group VIB metals and compounds comprising one or more Group VIII metals in hydrothermal conditions at a reaction temperature above the boiling temperature of the protic liquid, preferably in an autoclave at a reaction pressure above atmospheric pressure and. The invention also relates to the corresponding sulphided catalyst, to a process for the manufacture of said bulk catalyst and to the use of said catalyst for the hydrotreatment, in particular the hydrodesulphurization and hydrodenitrogenation of hydrocarbon feedstock.

13 Claims, No Drawings

BULK CATALYST COMPRISING METAL OXIDIC PARTICLES AND A PROCESS FOR THE MANUFACTURE THEREOF

PRIORITY CLAIM

This application claims the benefit of U.S. Provisional Application No. 60/730,911, filed Oct. 26, 2005.

The invention relates to a bulk catalyst comprising metal oxidic particles comprising one or more Group VIB metals and one or more Group VIII metals, to the corresponding sulphided catalyst, to a process for the manufacture of said bulk catalyst and to the use of said catalyst for the hydrotreatment, in particular the hydrodesulphurisation and hydrodenitrogenation of hydrocarbon feedstock.

The bulk catalyst according to the invention usually is in the form of shaped particles, for example produced by extrusion of a composition comprising the metal oxidic particles and 0-40 wt % (relative to the total weight of the bulk catalyst) of an additional material, in particular a binder material. A bulk catalyst is distinguished from a supported catalyst in that it does not comprise a preformed carrier material. The metal oxides are not deposited on the preformed carrier material, but are present as metal oxidic particles. The bulk catalyst is further distinguished from supported catalysts in that the bulk catalyst comprises at least 60 wt % of metal oxidic particles (wt % calculated on the basis of metal oxides relative to the total weight of the bulk catalyst) whereas supported catalysts have metal oxides deposited on a support material in amounts significantly less than 60 wt %. The metal oxidic particles typically comprise one or more Group VIB metals, preferably tungsten or molybdenum, and one or more Group VIII metals, preferably nickel or cobalt. The bulk catalysts generally have a very high activity in hydroprocessing.

The term "hydroprocessing or hydrotreatment" in this context encompasses all processes in which a hydrocarbon feed is reacted with hydrogen at elevated temperature and elevated pressure, including processes such as hydrogenation, hydrodesulphurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. Hereafter, when referring to a high activity of the bulk catalyst according to the invention, in particular the hydrodesulphurization activity is implied unless otherwise indicated.

WO 00/41810 describes bulk catalyst compositions comprising bulk catalyst particles comprising at least one group VIII metal and at least two group VIB metals (hereafter referred to as trimetallic bulk catalysts), in particular nickel/molybdenum/tungsten based catalysts. The trimetallic bulk catalyst particles are prepared in a process in which the metal components are combined in the presence of a protic liquid and wherein one or more metal components remains at least partly in the solid state during the entire process. The process wherein some of the compounds remain at least partly in the solid state while others are dissolved is referred to as the solid-solute process. The process wherein all group VIB and the group VIII metal components remain at least partly in the solid state is referred to as the solid-solid process. The patent publication also describes in the comparative examples a bulk catalyst comprising one group VIII metal and only one group VIB metal (hereafter referred to as bimetallic bulk catalyst) prepared with the solid-solute process.

Although WO 00/41810 describes wide ranges for the metal molar ratio, in the examples it is described that increasing conversion of the starting compounds is obtained at increasing group VIII over group VIB metal molar ratio. In particular, acceptable conversions are achieved only at a metal molar ratio above 1.25. The inventors have further found that in this process at a metal molar ratio below 1 a completely different crystal structure was obtained that was not active, possibly related to non- or partially reacted starting materials giving low surface area phases with low activity. It appears that a relatively large molar excess of group VIII compound appears to be necessary in the process for the preparation of the catalyst in order to obtain an active catalyst. From a theoretical point of view it is believed that such large amounts group VIII metal, although advantageous or even necessary in the process of the preparation of the catalyst, may not or not fully be necessary in the active sulphided bulk catalyst in hydrotreatment of a hydrocarbon feedstock. Further, the inventors believe that a too high metal molar ratio would only add useless weight and reduces the activity per unit weight of the bulk catalyst.

The object of the invention is to provide a bulk catalyst having a higher catalytic activity. A further object of the invention is to provide a bulk catalyst having a high catalytic activity in particular so at reduced group VIII over group VIB metal molar ratio.

According to the invention there is provided a bulk catalyst comprising metal oxidic particles comprising one or more Group VIB metals and one or more Group VIII metals obtainable by a process comprising the steps of i) combining in a reaction mixture one or more first compounds comprising one or more Group VIII metal and one or more second compounds comprising one or more Group VIB metals in the presence of a protic liquid, wherein the Group VIII metal to Group VIB metal molar ratio is between 0.1 and 5 and, ii) reacting the compounds in hydrothermal conditions at a reaction temperature above the boiling temperature of the protic liquid to form metal oxidic particles.

With boiling temperature is meant the boiling temperature at atmospheric pressure. It was surprisingly found that the catalyst according to the invention has a much higher activity, in particular in hydrodesulphurisation, compared to the same catalyst prepared in atmospheric non-hydrothermal conditions and even at a lower metal molar ratio. The term "hydrothermal conditions" is meant to imply reaction conditions wherein the reaction temperature is above the boiling temperature of the protic liquid. Typically such conditions give rise to a pressure above atmospheric pressure and then the reaction is preferably performed in an autoclave, preferably under autogenic pressure, that is without applying additional pressure. An autoclave is a device capable of withstanding pressure designed to heat liquids above their boiling temperature.

US 2004/182749 describes in some examples a preparation in an autoclave under pressure at 80° C., but not at a temperature above the boiling point of the protic liquid. It is further noted that prior art WO00/41810 discloses broad temperature ranges from 0 to 300° C. and mentions in general terms a possibility to prepare catalysts at a pressure above atmospheric pressure and at a reaction temperature above the boiling temperature of the protic liquid. WO00/41810 however mentions that generally the reaction is carried out at atmospheric pressure and has no examples or description of bulk catalyst according to the invention wherein the metal compounds are actually reacted in hydrothermal conditions in an autoclave at a reaction pressure above atmospheric pressure and, in case of water as protic liquid, at a temperature above 100° C. to form metal oxidic particles. In particular, the relation between the metal molar ratio, the hydrothermal reaction process and the improved catalytic activity of the catalysts obtainable by said process are not described.

In the bulk catalyst according to the invention, the group VIII to Group VIB metal molar ratio can in principle vary between wide ranges, for example between 0.1 and 5. Generally good results can be obtained with a metal molar ratio between 0.2 and 4. In this range two different sub-ranges were distinguished. In the metal molar ratio range between 0.2 and 1 it often appeared difficult if not impossible to obtain a good catalyst when the first and second metal compounds are reacted in atmospheric pressure conditions (good and better in this context mean: a bulk catalysts with high or higher hydrodesulphurisation or hydrodenitrogenation activity than the prior art). In this metal molar ratio range the XRD pattern showed a large number of peaks, possibly originating from raw materials still present and/or unidentified compounds formed. A catalyst having such XRD pattern was found to be inactive. It was surprisingly found that, when the metal mole ratio is between 0.2 and 1, a good bulk catalyst could nevertheless be obtained when the reaction between the first (Group VIII) and second (Group VIB) metal compounds takes place according to the invention in hydrothermal conditions at a pressure higher than 1 bar and at T>100° C.

When the Group VIII to Group VI metal molar ratio is above 1, an active catalyst can be prepared under atmospheric reaction conditions, however also in this metal molar ratio range the bulk catalyst according to the invention has a higher activity than the prior art bulk catalyst with the same metal molar ratio. As described above it is not desirable to have a too high group VIII excess. Further, it was found that in hydrothermal reaction conditions the additional effect of a higher metal molar ratio levels off, the metal molar ratio in hydrothermal conditions is preferably lower than 1.5, more preferably lower than 1.25, even more preferably lower than 1.15 and most preferably below 1.

The Group VIII to Group VI metal molar ratio can be chosen lower in hydrothermal conditions. Alternatively, the activity can be higher at the same metal molar ratio. The bulk catalyst according to the invention preferably has an increase in hydrodesulphurisation activity, compared to a catalyst with the same composition but produced in atmospheric conditions, of at least 10%, preferably at least 15%, more preferably at least 20%, even more preferably at least 25% and most preferably at least 30% (the hydrodesulphurisation activity as determined in the standard test described below in the description of the examples according to the invention). Alternatively, the bulk catalyst according to the invention preferably has at least 10%, more preferably at least 15%, even more preferably at least 20% and most preferably at least 25% lower metal molar ratio whilst maintaining an equal or higher hydrodesulphurisation activity level. Preferably, in view of achieving a high activity in these hydrothermal conditions the group VIII to Group VIB metal molar ratio is more than 0.3, preferably more than 0.4, more preferably more than 0.5, even more preferably more than 0.6 and most preferably more than 0.7.

For many reasons water is the best choice for the protic liquid. However, other protic liquids are not excluded and therefore the "hydrothermal reaction conditions" in this context is intended to also cover reaction conditions using a protic liquid other than water at temperatures above the boiling temperature of the protic liquid, typically at a pressure above atmospheric pressure. The reaction temperature preferably is at least 10%, more preferably at least 25%, even more preferably at least 50%, and most preferably at least 75% higher than the boiling temperature of the protic liquid. The reaction is preferably done in water as the protic liquid at a reaction temperature of at least 110, preferably at least 125, even more preferably at least 150, and most preferably at least 175° C. preferably in an autoclave preferably under autogenic elevated pressure. Good results can be obtained at reaction temperatures between 110° C. and 170° C. In a preferred embodiment of the invention the reaction mixture is heated with microwave radiation. Solute components in the reaction mixture may increase the boiling temperature of the protic liquid.

The reaction time is chosen sufficiently long to substantially complete the reaction. The reaction is complete when the x-ray diffractogram of the separated metal oxidic particles does not show reflections of the unreacted starting compounds. In any case, the reaction time is chosen such that the final bulk catalyst after drying, shaping and calcining does not show reflections of the unreacted starting compounds. Typically, the reaction is carried out for a time of at least 2 hours, preferably at least 4 hours, more preferably at least 6 hours and most preferably at least 8 hours. A particular advantage of the hydrothermal reaction process is that reaction speed of the metal compounds is higher such that the reaction can be completed in a shorter reaction time. This is advantageous especially when a low Group VIII to Group VI metal molar ratio is wanted because a low metal ratio was found to reduce the reaction speed during the preparation.

The metal composition in the bulk catalyst according to the invention may in principle vary between wide ranges as described in the prior art for conventional hydrotreatment catalyst. In one embodiment, the bulk catalyst comprises metal oxidic particles comprising preferably only one group VIII metal, preferably cobalt or nickel, and substantially only 2 group VIB metals, preferably tungsten and molybdenum (a trimetallic catalyst). In another embodiment, the bulk catalyst is a bimetallic catalyst comprising only one group VIB metal. Preferably, the bulk catalyst comprises metal oxidic particles comprising substantially only one group VIII metal, preferably nickel, and substantially only 1 group VIB metal, preferably tungsten. A bimetallic bulk catalyst can be distinguished from a trimetallic catalyst in that it comprises less than 10 mole % of a second group VIB metal (relative to the total amount of Group VIB metals) but preferably comprises substantially only one Group VIB metal. The term "substantially only one group VIB or group VIII metal" implies that the catalyst most preferably has no other, but may have an insubstantial amount of another Group VIB or group VIII metal, preferably less than 5, more preferably less than 3 and most preferably less than 1 mole % (relative to the total of the group VIB or group VIII metals).

In an alternative embodiment, the bulk catalyst according to the invention comprises a Group V metal, preferably Niobium. It was found that a significant activity improvement could be obtained even with relatively small amounts between 0.1 and 10 mole %, preferably between 0.1 and 9 mole %, more preferably between 0.1 and 8 mole %, even more preferably between 0.1 and 7 mole % and most preferably between 0.1 and 5 mole %.

In the first step of the process for preparing the bulk catalyst according to the invention the reaction compounds are combined to form a reaction mixture. This can be done in a variety of different ways as for example described in WO 00/41810, WO 99/03578, WO 2004/073859, WO 2005/005582, EP2005/004265 (not prepublished) and WO 00/41811. The first and/or second compounds can be soluble or at least partly insoluble in the protic liquid. It is possible to first prepare a suspension or solution of a metal compound in the protic liquid and to add, simultaneously or one after the other, solution(s) and/or further suspension(s) comprising dissolved and/or suspended metal compound(s) in the protic liquid. It is also possible to first combine solutions either simultaneously or one after the other and to subsequently add further suspension(s) and optionally solution(s) either simultaneously or one after the other.

The bulk catalyst according to the invention is preferably prepared in a process wherein the one or more first metal compounds and/or the one or more second metal compounds, most preferably all first and second metal compounds, remain at least partly in the solid state during the entire reaction. This process is relatively simple, has a high yield and is environmentally friendly, but most importantly the bulk catalyst obtainable by said process was found to be highly active. The term "at least partly in the solid state" means that at least part of the metal compound is present as a solid metal compound and, optionally, another part of the metal compound is present as a solution of this metal compound in the protic liquid. This process is referred to as the solid-solid process and is described in detail in WO 00/41810 as one of several possible preparation routes to prepare trimetallic bulk catalyst.

It was often observed that the bulk catalyst according to this process has a metastable hexagonal structure. This metastable hexagonal structure has, in case the group VIB metal is tungsten, an X-ray diffraction pattern with a reflection between 58 and 65 (diffraction angle 2 theta) and main reflections between 32 and 36 and between 50 and 55°. In case the group VIB metal is Molybdenum, the X-ray diffraction pattern shows two reasonably well-resolved reflections, one between 33 and 35, the other between 58 en 61°. The presence of the metastable hexagonal phase appeared to be indicative of a high catalytic activity of the oxidic bulk catalyst, although there is no strict quantitative relation found. Because the physical reasons for the correlation are not fully understood or known and the inventors do not wish to be bound and limited by theory, the bulk catalyst according to the invention is claimed without reference to the described X-ray diffraction features relating to the presence of a metastable hexagonal phase. It is preferred that reflections of other crystalline compounds are substantially absent in the X-ray diffraction pattern. It is considered that amorphous phases may also be present. However, it was found that catalysts having a good activity typically had full width at half maximum (FWHM) below 2.5 indicating that amorphous phases and associated broad XRD peaks are not good for activity.

It was found that the metal oxidic particles in the bulk catalyst according to the invention are particularly sensitive to heat treatment. It is important that the bulk catalyst, in particular the metal oxidic particles in the bulk catalyst, have been heat treated at a temperature below a temperature where transition to a crystalline structure occurs. When in this context reference is made to "transition to a crystalline structure", a crystal structure other than the metastable hexagonal phase is meant. This applies to any and all heat treatment steps in the production process of the bulk catalyst. This applies in particular also to heat treatment of shaped bulk catalyst particles after compositing and shaping. Preferably, the bulk catalyst is heat treated below 450° C., more preferably below 400° C., even more preferably below 375° C. and most preferably below 350° C. This applies also to drying and calcination.

After the reaction step, the metal oxidic particles preferably have a median particle size in the range of at least 0.5 μm, more preferably at least 1 μm, most preferably at least 2 μm, but preferably not more than 5000 μm, more preferably not more than 1000 μm, even more preferably not more than 500 μm, and most preferably not more than 150 μm. Even more preferably, the median particle diameter lies in the range of 1-150 μm and most preferably in the range of 2-150 μm. Preferably, the median particle size of the metal oxidic particles remains substantially unchanged in the bulk catalyst after compositing with a binder material and shaping (determined by Near Forward Scattering).

The bulk catalyst comprises at least 60 wt % of metal oxidic particles (wt % calculated on the basis of metal oxides relative to the total weight of the bulk catalyst) as distinguished from supported catalysts that have metal oxides deposited on a support material in amounts significantly less than 60 wt %. Preferably, the bulk catalyst according to the invention comprises at least 70 wt %, more preferably at least 75 wt %, even more preferably at least 80 wt % and most preferably at least 85 wt % metal oxidic particles, the remaining 0 to 40 wt % being one or more materials selected from the group of binder materials, conventional hydroprocessing catalysts, acidic promoters such as phosphorus of fluorine and cracking compounds. Typically, after compositing of the metal oxidic particles with a binder, the composition is shaped, preferably extruded, to form shaped bulk catalyst particles. The invention also relates to shaped bulk catalyst particles comprising the metal oxidic particles. Alternatively, the metal oxidic bulk catalyst particles can be used directly, that is without substantial compositing and shaping, in a hydrotreatment process. This process is referred to as a slurry hydrotreatment process. For this use, the particles are preferably treated to obtain a narrower particle size distribution, for example by sieving or agglomerating, but without substantial compositing and shaping. The invention also relates to the use of metal the catalyst according to the invention in a slurry hydrotreatment process, preferably using metal oxidic bulk catalyst particles without substantial compositing and shaping.

Preferably, the bulk catalyst according to the invention, preferably after compositing and shaping, has a B.E.T. surface area of at least 10 m$^2$/g, more preferably of at least 50 m$^2$/g, and most preferably of at least 80 m$^2$/g, as measured via the B.E.T. method. The median pore diameter (50% of the pore volume is below said diameter, the other 50% above it) of the bulk catalyst preferably is 3-25 nm, more preferably 5-15 nm (determined by N2 desorption). The total pore volume of the bulk catalyst preferably is at least 0.05 ml/g and more preferably at least 0.1 ml/g, as determined by N2 adsorption.

It is desired that the pore size distribution of the bulk catalyst according to the invention, preferably after compositing and shaping, is approximately the same as that of conventional hydroprocessing catalysts. More in particular, the bulk catalyst preferably has (desorption) median pore diameter of 3-25 nm, as determined by nitrogen adsorption, a pore volume of 0.05-5 ml/g, more preferably of 0.1-4 ml/g, still more preferably of 0.1-3 ml/g, and most preferably of 0.1-2 ml/g, as determined by nitrogen desorption.

Generally, the bulk catalyst according to the invention after compositing and shaping has a mechanical strength, expressed as side crush strength (SCS), of at least 1 lbs/mm and preferably of at least 3 lbs/mm (measured on extrudates with a diameter of 1-2 mm). The SCS of the bulk catalyst can be adequately increased by compositing the metal oxidic particles with a sufficient amount of binder.

To obtain catalyst compositions with high mechanical strength, it may be desirable for the catalyst composition of the invention to have a low macroporosity. Preferably, less than 30%, more preferably less than 20% of the pore volume of the catalyst composition is in pores with a diameter higher than 100 nm (determined by mercury intrusion, contact angle: 140°).

The invention also relates to a sulphided bulk catalyst comprising a bulk catalyst according to the invention, which has been sulphided. The invention further also relates to the use of the bulk catalyst or sulphided bulk catalyst according to the invention for the hydrotreatment of a hydrocarbon feedstock. The term "hydroprocessing" in this context encompasses all processes in which a hydrocarbon feed is reacted with hydrogen at elevated temperature and elevated pressure, including processes such as hydrogenation, hydrodesulphurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. The catalyst composition of the invention is particularly suitable for hydrotreating hydrocarbon feedstocks. Such hydrotreating processes comprise, e.g., hydrodesulphurization, hydrodenitrogenation, and hydrodearomatization of hydrocarbon feedstocks. Suitable feedstocks are, e.g., middle distillates, kero, naphtha, vacuum gas oils, and heavy gas oils. The bulk catalyst according to the invention can be used in virtually all hydroprocessing processes to treat a plurality of feeds under wide-ranging reaction conditions, e.g., at temperatures in the range of 200° to 450° C., hydrogen pressures in the range of 5 to 300 bar, and liquid hourly space velocities (LHSV) in the range of 0.05 to 10 h$^{-1}$ and H$_2$/oil ratios in the range of 50-2000 Nl/l.

Apart from the hydrothermal conditions and the implications regarding the Group VIII to Group VI metal molar ratio the bulk catalyst manufacturing can be done according to processes known in the art. Suitable processes are for example described in WO 00/41810, which is herewith incorporated by reference.

The invention also relates to a process for the manufacture of the bulk catalyst according to the invention comprising metal oxidic particles obtainable by the steps of;
i) combining in a reaction mixture one or more first compounds comprising one or more Group VIII metal and one or more second compounds comprising one or more Group VIB metals in the presence of a protic liquid, wherein the Group VIII metal to Group VIB metal molar ratio is between 0.1 and 5 and
ii) reacting the compounds in hydrothermal conditions at a temperature above the boiling point of the protic liquid, preferably in an autoclave at a reaction pressure above atmospheric pressure, to form metal oxidic particles,
the process further optionally comprising one or more of the following process steps:
iii) separating the metal oxidic particles from the reaction mixture,
iv) compositing the metal oxidic particles with 0.1 to 40 wt % of one or more materials selected from the group of binder materials, conventional hydroprocessing catalysts, cracking compounds, acidic additives or mixtures thereof before, during or after the combining and/or reacting of the metal compounds,
v) spray-drying, (flash) drying, milling, kneading, slurry-mixing, dry or wet mixing, or combinations thereof,
vi) shaping,
vii) drying and/or thermally treating, and
viii) sulphiding.

Further preferences and detail regarding the hydrothermal conditions and the Group VIII to Group VI metal molar ratio are described above in the description of the bulk catalyst.
Step (i)
The protic liquid to be applied in the process of the present invention can be any protic liquid. Examples are water, carboxylic acids, and alcohols such as methanol, ethanol or mixtures thereof. As the protic liquid in the process of the present invention preferably a liquid is used that comprises water, such as mixtures of an alcohol and water and more preferably water. Also different protic liquids can be applied simultaneously in the process of the invention. For instance, it is possible to add a suspension or solution of a metal compound in ethanol to an aqueous suspension/solution of another metal compound. If the protic liquid is water, the solubility of the Group VIII metal compounds and Group VIB metal compounds which are at least partly in the solid state during the process of the invention generally is less than 0.05 mol/(100 ml water at 18° C.).

In the preferred process, both the first and second metal compounds remain at least partly in the solid state during the entire reaction (the solid-solid process). If the protic liquid is water, suitable nickel compounds which are at least partly in the solid state during the reaction comprise, and more preferably consist essentially of, oxalates, citrates, carbonates, hydroxy-carbonates, hydroxides, molybdates, phosphates, tungstates, oxides, or mixtures thereof, with nickel hydroxy-carbonate, nickel hydroxide, nickel carbonate, or mixtures thereof being most preferred. Generally, the molar ratio between the hydroxy groups and the carbonate groups in the nickel hydroxy-carbonate lies in the range of 0-4, preferably 0-2, more preferably 0-1 and most preferably 0.1-0.8. Suitable tungsten compounds which are at least partly in the solid state during the process of the invention comprise water-insoluble tungsten compounds, such as tungsten di- and trioxide, tungsten sulphide (WS$_2$ and WS$_3$), tungsten carbide, ortho-tungstic acid (H$_2$WO$_4$*H$_2$O), tungsten nitride, aluminium tungstate (also meta- or polytungstate), ammonium phosphotungstate, or mixtures thereof, with ortho-tungstic acid and tungsten di- and trioxide being preferred. Preferably, the reaction between the first and second metal compound is an acid/base reaction and the first or second metal compound is a basic solid and the other metal compound is an acidic solid compound.

In the most preferred embodiment of the process according to the invention, the first and second solid metal compound are free from nitrogen atoms and the protic liquid separated from the reacted metal oxidic particles in step iii) is re-used at least in part to form the slurry in step i). Most preferably, in this process the first metal compound is a nickel (hydroxy) carbonate and the second metal compound is tungstic oxide or acid.

For several reasons, this process meets the highest standard of environmentally friendly and economically optimal catalyst production. Apart from the fact that the metal compounds do not contain nitrogen atoms, also the reaction does not require addition of ammonia to the reaction mixture, as for example in WO 2004/073859, so the process is entirely free of nitrogen atoms. There is no accumulation of alien ions like ammonium and/or nitrate in the protic liquid on repeated recycling, there is no strict need for washing the obtained separated oxidic particles, less environmental hazard because of reduced loss of precious metals and there is no danger of explosions due to ammonium nitrate salt formation.

In view of environmental issues, preferably the catalyst is bimetallic, preferably Nickel tungsten; the chemistry in the reaction step is simpler, because there is only one group VIB metal there can be no composition drift in the group VIB metals on recycling of the separated liquid after reaction. Because the compounds remain at least partly solid during the entire reaction the amount of metals dissolved in the protic liquid is small and hence losses are smaller. Furthermore, the spent bimetallic catalyst is easier to recycle to the constituent metals than the trimetallic catalyst because there is no need to separate two group VIB metals, which is very difficult. Conventional processes for the separation of nickel and tungsten can be used. This is advantageous in terms of reduced recycling process complexity, costs and increased metal recovery yield.

To obtain a final catalyst composition with high catalytic activity, it is preferred that the first and second solid metal compound(s) are porous metal compounds. For the first metal compound, preferably Ni hydroxy carbonate, the surface area (SA): SA>220 m$^2$/g, the pore volume pV>0.29 cm$^3$/g (as measured by N adsorption), and the median pore diameter MPD>3.8 nm (as measured by N desorption) and for the second metal compound, preferably tungstic acid, SA>19 m$^2$/g, pV>0.04 cm$^3$/g (as measured by N adsorption), desorption MPD>6.1 nm (as measured by N desorption). It is desired that the total pore volume and the pore size distribution of these metal compounds are similar to those of conventional hydroprocessing catalysts. Preferably, the pore volume is 0.05-5 ml/g, preferably of 0.05-4 ml/g, more preferably of 0.05-3 ml/g, and most preferably 0.05-2 ml/g, as determined by mercury or water porosimetry. Further, the surface area preferably is at least 10 m$^2$/g, more preferably of at least 20 m$^2$/g, and most preferably at least 30 m$^2$/g, as determined via the B.E.T. method.

The median particle diameter of the first and second solid metal compound(s) preferably is in the range of at least 0.5 μm, more preferably at least 1 μm, most preferably at least 2 μm, but preferably not more than 5000 μm, more preferably not more than 1000 μm, even more preferably not more than 500 μm, and most preferably not more than 150 μm. Even more preferably, the median particle diameter lies in the range of 1-150 μm and most preferably in the range of 2-150 μm (as determined by near forward scattering). Generally, the smaller the particles size of the metal compounds, the higher their reactivity. Therefore, metal compounds with particle sizes below the preferred lower limits are in principle a preferred embodiment of the present invention. However, for health, safety, and environmental reasons, the handling of such small particles requires special precautions.

Step (ii)

During and/or after the addition of the metal compounds, the slurry is kept at the reaction temperature for a certain period of time to allow the reaction between the compounds to take place. In general, the step of slurrying and combining the raw materials is not critical, providing that a sufficient amount of solvent is present to ensure that the slurry can be well stirred. Moreover, in case of very reactive and/or partly soluble raw materials, it should be prevented that the raw materials react vigorously already during their addition. This can again be achieved by e.g. increasing the amount of solvent or by lowering the temperature at which the raw materials are combined. A person skilled in the art should be able to choose suitable conditions.

Generally, the slurry is kept at its natural pH during the reaction step. However, also basic material may be added to increase the pH, as described in WO 2004/073859, where ammonium is added. The pH preferably is in the range of 0-12, more preferably in the range of 3-9, and even more preferably in the range of 5-8.

The parameters that are important for the performance of the bulk catalyst according to the invention, in particular the reaction temperature and pressure, the Group VIII to Group VI metal molar ratio, the hydrothermal reaction conditions and the reaction time are described above in more detail in the description of the bulk catalyst. As described it is required in the process according to the invention that when the Group VIII to Group VI metal molar ratio is between 0.2 and 1, the reaction is done under hydrothermal conditions at a reaction temperature above 100° C. and a pressure higher than 1 bar. When the metal mole ratio is above 1, the catalyst obtained can also be advantageously produced under hydrothermal conditions in order to be able achieve higher activity or to use lower nickel molar ratio or to react faster.

Step (iii)

After the reaction step, if necessary, the obtained metal oxidic particles can be separated from the liquid, e.g., via filtration or spray drying. In one alternative embodiment, such a small amount of protic liquid is used that no liquid needs to be separated from the solid reaction product. The wet reaction product can directly be shaped after optional compositing with additional material as defined below and then dried. For the separation of the metal oxidic particles in principle any solid-liquid separation technique can be used. The separation can be done before or after being composited with additional materials. After solid-liquid separation, optionally, a washing step can be included. Further, it is possible to thermally treat the bulk catalyst after an optional solid-liquid separation and drying step and prior to its being composited with the additional material.

Step (iv)

If so desired, an additional material selected from the group of binder materials, conventional hydroprocessing catalysts, cracking compounds, or mixtures thereof can be added during the above-described preparation of the metal oxidic particles or to the metal oxidic particles after their preparation. Preferably, this additional material is added to the slurry after the preparation of the metal oxidic particles and prior to the separation step, but in any case prior to the shaping step. It is mostly added after the separation from the liquid in the mixing/kneading step. Examples of other additional materials that can be composited with the metal oxidic particles in the catalyst according to the invention are described in WO 00/41810.

In all the above-described process alternatives, the term "compositing the bulk catalyst with a material" means that the material is added to the bulk catalyst or vice versa and the resulting composition is mixed. Mixing is preferably done in the presence of a liquid ("wet mixing"). This improves the mechanical strength of the final catalyst composition.

Compositing the metal oxidic particles with said additional material and/or incorporating the material during the preparation of the metal oxidic particles leads to bulk catalysts of particularly high mechanical strength, in particular if the median particle size of the metal oxidic particles is in the range of at least 0.5 μm, more preferably at least 1 μm, most preferably at least 2 μm, but preferably not more than 5000 μm, more preferably not more than 1000 μm, even more preferably not more than 500 μm, and most preferably not more than 150 μm. Even more preferably, the median particle diameter lies in the range of 1-150 μm and most preferably in the range of 2-150 μm.

The compositing of the metal oxidic particles with the material results in metal oxidic particles embedded in this material or vice versa. Normally, the morphology of the metal oxidic particles is essentially maintained in the resulting bulk catalyst.

The binder materials to be applied may be any materials conventionally applied as binders in hydroprocessing catalysts. Examples are silica, silica-alumina, such as conventional silica-alumina, silica-coated alumina and alumina-coated silica, alumina such as (pseudo)boehmite, or gibbsite, titania, titania-coated alumina, zirconia, cationic clays or anionic clays such as saponite, bentonite, kaolin, sepiolite or hydrotalcite, or mixtures thereof. Preferred binders are silica, silica-alumina, alumina, titania, titania-coated alumina, zirconia, bentonite, or mixtures thereof. These binders may be applied as such or after peptization.

Step(v)

The slurry, optionally comprising any of the above additional materials can be subjected to spray-drying, (flash) drying, milling, kneading, slurry-mixing, dry or wet mixing, or combinations thereof, with a combination of wet mixing and kneading or slurry mixing and spray-drying being preferred. These techniques can be applied either before or after any of the above (further) materials are added (if at all), after solid-liquid separation, before or after a thermal treatment, and subsequent to re-wetting.

Step(vi)

If so desired, the metal oxidic particle optionally mixed with any of the above additional materials may be shaped optionally after step (ii) having been applied. Shaping comprises extrusion, pelletizing, beading and/or spray-drying. Any additives which are conventionally used to facilitate shaping can be added. These additives may comprise aluminium stearate, surfactants, graphite, starch, methyl cellulose, bentonite, polyethylene glycols, polyethylene oxides, or mixtures thereof. If the shaping comprises extrusion, beading and/or spray-drying, it is preferred that the shaping step is carried out in the presence of a liquid, such as water. Preferably, for extrusion and/or beading, the amount of liquid in the shaping mixture, expressed as loss of ignition (LOI), is in the range of 20-80% (LOI after 1 hour at 600° C.).

Step (vii)

After an optional drying step, preferably above 100° C., the resulting shaped catalyst composition may be thermally treated if desired. A thermal treatment, however, is not essential to the process of the invention. As described above, a bulk catalyst having a temperature sensitive metastable hexagonal phase which readily transforms to a crystalline structure, are preferably heat treated at a temperature below a temperature where such transition to a crystalline structure occurs, preferably below 450° C., more preferably below 400° C., even more preferably below 375° C., most preferably even below 350° C. This thermal treatment is typically done on the final bulk catalysts after compositing and shaping. The heat treating time can vary from 0.5 to 48 hours and is done in an inert gas such as nitrogen, or in an oxygen-containing gas, such as air or pure oxygen. The thermal treatment can be carried out in the presence of water steam.

The process of the present invention may further comprise a sulphidation step. Sulphidation generally is carried out by contacting the bulk catalyst, directly after the preparation of the metal oxidic particles or after any one of the further process steps (iii)-(vii), most preferably after the shaping to a shaped bulk catalyst, with a sulphur-containing compound such as elementary sulphur, hydrogen sulphide, DMDS, or inorganic or organic polysulphides. The sulphidation can generally be carried out in situ and/or ex situ. Preferably, the sulphidation is carried out ex situ, i.e. the sulphidation is carried out in a separate reactor prior to the sulphided catalyst composition being loaded into the hydroprocessing unit. Furthermore, it is preferred that the catalyst composition is sulphided both ex situ and in situ.

A preferred process of the present invention comprises the following successive process steps of preparing the bulk catalyst according to the invention; contacting and reacting the first and second compound in a slurry with protic liquid as described above, slurry mixing the obtained oxidic metal particles with, e.g., a binder, isolating the particles via filtration, wet mixing the filter cake with a material, such as a binder, kneading, extrusion, drying, calcining and sulphiding.

The catalysts are characterized using the following methods:

1. Side Crush Strength SCS

First, the length of, e.g., an extrudate particle was measured, and then the extrudate particle was subjected to compressive loading (25 lbs in 8.6 sec.) by a movable piston. The force required to crush the particle was measured. The procedure was repeated with at least 40 extrudate particles and the average was calculated as force (lbs) per unit length (mm). The method preferably was applied to shaped particles with a length not exceeding 7 mm.

2. Porosimetry

The N2 adsorption measurement was carried out as described in: Paul A. Webb and Clyde Orr, "Analytical Methods in Fine Particle Technology", Micromeritics Instrument Corporation, Norcross, Ga., USA, 1977, ISBN 0-9656783-0-X. Where median pore diameter MPD is mentioned, we refer to the pore size distribution extracted from the desorption branch of the nitrogen sorption isotherm according to the BJH method as published: P. Barrett, L. G. Joyner, P. P. Halenda; The determination of pore volume and area distributions in porous substances. I. Computations from nitrogen isotherms, J. Am. Chem. Soc. (1951), 73, 373-380. Total surface area is determined by the BET method: S. Brunauer, P. H. Emmett and E. Teller, Adsorption of gases in multimolecular layers, J. Am. Chem. Soc. (1938), 60, 309-319.

Macropore volume determination, typically for pores having 60 nm or higher pore diameter, was carried out by mercury (Hg) porosimetry as described in e.g. Paul A. Webb and Clyde Orr, "Analytical Methods in Fine Particle Technology", Micromeritics Instrument Corporation, Norcross, Ga., USA, 1977, ISBN 0-9656783-0-X. The contact angle used was 140 degrees.

3. Amount of Added Solid Metal Compounds

Qualitative determination: The presence of solid metal compounds during the process of the invention can easily be detected by visual inspection at least if the metal compounds are present in the form of particles with a diameter larger than the wavelength of visible light. Of course, methods such as quasi-elastic light scattering (QELS) or near-forward scattering, which are known to the skilled person, can also be used to verify that at no point in time during the process of the invention all metals will be in the solute state. Median particle size was also determined with light scattering (near forward scattering).

Quantitative determination: if the metal compounds which are added at least partly in the solid state are added as suspension(s), the amount of solid metal compounds added during the process of the invention can be determined by filtration of the suspension(s) to be added under the conditions which are applied during the addition (temperature, pH, pressure, amount of liquid), in such a way that all solid material contained in the suspension(s) is collected as solid filter cake. From the weight of the solid and dried filter cake, the weight of the solid metal compounds can be determined by standard techniques. Of course, if apart from solid metal compounds further solid compounds, such as a solid binder, are present in the filter cake, the weight of this solid and dried binder must be subtracted from the weight of the solid and dried filter cake. The amount of solid metal compounds in the filter cake can also be determined by standard techniques such as atomic absorption spectroscopy (AAS), XRF, wet chemical analysis, or ICP.

If the metal compounds which are added at least partly in the solid state are added in the wetted or dry state, a filtration generally is not possible. In this case, the weight of the solid metal compounds is considered equal to the weight of the corresponding initially employed metal compounds, on a dry basis. The total weight of all metal compounds is the amount of all metal compounds initially employed, on a dry basis, calculated as metal oxides.

4. Characteristic Full Width at Half Maximum

The characteristic full width at half maximum of the oxidic catalysts was determined on the main reflections in the X-ray diffraction pattern of the catalyst (in terms of 2θ scattering angle). For the determination of the X-ray diffraction pattern, a standard powder diffractometer equipped with a graphite monochromator can be used. The measurement conditions can, e.g., be chosen as follows: X-ray generator settings: 40 kV and 40 mA, wavelength: 1.5418 angstroms, divergence and anti-scatter slits: v20 (variable), detector slit: 0.6 mm, step size: 0.05 (°2θ), time/step: 2 seconds, Instrument: Bruker D5000.

The invention will be further illustrated by the Examples described below. R3 means a reaction process wherein both the first and second metal compounds are at least partly solid during the reaction. CBD means compacted bulk density of the catalyst. HT means hydrothermal reaction conditions. The diesel hydroprocessing test results are given in Table 4 wherein RVA and RWA are relative volume activity and relative weight activity, respectively, based on the total catalyst amount loaded in the reactor. HDN is hydrodenitrogenation and HDS is hydrodesulphurisation.

The diesel test procedure was performed using two different temperature and pressure test conditions 1 and 2. The postfix 1 or 2 (as for example in RWA1 and RWA2) refer to the test condition 1 and 2 respectively. The RWA HDN1 results are not shown because the nitrogen levels in the reaction product were all so low that the measurement is inaccurate and differences between the samples are too small to identify differences in catalytic activity between samples. Further, the residual nitrogen and sulphur levels after the hydrotreatment were determined and given in Table 6 under column S1, S2 and N2. In the tests different diesel test procedures were used indicated as D1, D2 and D3. The RWA/RVA values of the reference catalysts C1 in diesel test procedure D1 and D2 (C1.1 and C1.2 in Table 4) and C2 in diesel test procedure D3 were defined as 100. All other RWA/RVA values are calculated relative to this reference catalyst.

COMPARATIVE EXPERIMENT C1.1 and C1.2

Ni1 Mo0.5W0.5 R3

115.2 g of $MoO_3$ (0.8 mole Mo, ex. Aldrich), 200 g of tungstic acid $H_2WO_4$ (0.8 mole W, ex. Aldrich) were slurried in 6400 ml of water (suspension A) and heated to 90° C. 188 g of nickel hydroxycarbonate $2NiCO_3*3Ni(OH)_2*4H_2O$ (1.6 mole of Ni, ex. Aldrich) were suspended in 1600 ml of water and heated to 90° C. (suspension B). The nickel hydroxycarbonate used in this and the other examples had a B.E.T. surface area of 239 $m^2/g$. Suspension B was added to suspension A in 10 minutes, and the resulting mixture was maintained at 90° C. for a period of 16 hours (overnight) with continuous stirring. At the end of this time, the suspension was filtered. The yield was above 98%. The obtained filter cake was dried overnight at 120° C. The obtained filter cake was wet-mixed with 10 wt % binder, extruded, dried, calcined and sulphided as described in Diesel test procedure D2 (results C1.2 in Table 6). The extrudates were crushed and 40-60 mesh fraction was isolated by sieving. The material was then sulphided and tested using the procedure from Diesel test procedure D1 (C1.1 in Table 6).

EXAMPLE E1

Ni0.75W1 R3 HT

A catalyst having a Ni/W molar ratio of 0.75 to 1 was prepared in a manner analogous to what is described in C1, except that the reaction was carried out under autogenic pressure in an autoclave reactor heated with microwave radiation at a reaction temperature of 150° C. and that the reaction time was about 6 hours. 1.76 g of Ni carbonate (0.015 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulphided and tested using the procedure from Diesel test procedure D1. Surprisingly, the performance of the bimetallic catalyst is improved as compared to the trimetallic catalyst of C1.1 (Table 6)

EXAMPLE E2

Ni1W1 R3 HT

A catalyst was prepared as described in E1, except that the Ni/W molar ratio was 1 to 1 and that the reaction was carried out under autogenic pressure in an autoclave reactor heated with microwave radiation at a reaction temperature of 150° C. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulphided and tested using the procedure from Diesel test procedure D1. Surprisingly, the performance of the bimetallic material of E2 is improved as compared to the trimetallic C1.1.

EXAMPLE E3

Ni0.5W1 R3 HT

A catalyst was prepared as described in E1, except that the Ni/W molar ratio was 0.5 to 1 and that the preparation was carried out on a larger scale. 164.5 g of Ni carbonate (1.4 mole Ni) was added to 14 liters of water along with 699.6 grams of tungstic acid (2.8 mole W). The suspension was put into a 5-gallon autoclave, the autoclave was closed and heated at 10° C./min to 150° C. and held at that temperature for 6 hours with continuous stirring. The sample was cooled to room temperature and the solid filtered and dried overnight at 120° C. The obtained material was wet-mixed with 10 wt % binder, extruded, dried, calcined and sulphided as described in C1 and tested using Diesel test procedure D2.

EXAMPLE E4

Ni0.5W0.975Nb0.025 R3 HT

A catalyst was prepared as described in E1, except that Nb was added to the reaction mixture, that the Ni to W to Nb molar ratio was 0.5 to 0.975 to 0.025, and that the preparation was carried out on a larger scale. 164.5 g of Ni carbonate (1.4 mole Ni) was added to 14 liters of water along with 682.5 grams of tungstic acid (2.73 mole W) and 11.19 g of niobic acid (0.07 moles Nb) (ex. CBBM Industries). The suspension was put into a 5-gallon autoclave, the autoclave was closed and heated at 10° C./min to 150° C. and held at that temperature for 6 hours with continuous stirring. The sample was cooled to room temperature and the solid filtered and dried overnight at 120° C. The obtained material of combined parallel preparations were extruded (with 10 wt % binder), dried, calcined and sulphided as described in C1 and tested using Diesel test procedure D2. Surprisingly, the performance of the Nb containing material is improved as compared to the bimetallic catalyst E3 and the trimetallic catalyst C1.2 (Table 6).

EXAMPLE E5

Ni1 Mo0.5W0.5 R3 HT

A catalyst was prepared with Ni to Mo to W molar ratio 1 to 0.5 to 0.5. 2.35 g of Ni carbonate (0.02 moles Ni) was added to 100 cc of water along with 2.5 grams of tungstic acid (0.01 mole W) and 1.44 g of $MoO_3$ (0.01 mole Mo). The suspension was put into a sealed Weflon™ vessel of 275 cc total volume and heated with microwave radiation at 10° C./min to 150° C. and held at that temperature under autogenic pressure for 6 hours with continuous stirring. The sample was cooled to room temperature and the solid filtered and dried overnight at 120° C. The obtained material was pelleted, the pellets were crushed and 40-60 mesh fraction was isolated by sieving. The catalyst was sulphided and tested using the Diesel test procedure D3.

COMPARATIVE EXPERIMENT C2

Ni1W0.5Mo0.5 R3

188 g of nickel hydroxycarbonate $2NiCO_3*3Ni(OH)_2*4H_2O$ (1.6 mole of Ni) were suspended in 8000 ml of water and the resulting slurry was heated to 60° C. Subsequently 115.2 of $MoO_3$ (0.8 mole Mo) and 200 g of tungstic acid $H_2WO_4$ (0.8 mole W) were added and the resulting slurry was heated to 95° C. and maintained at that temperature for a period of about 24 hours with continuous stirring. At the end of this time, the suspension was filtered. The obtained filter cake was wet-mixed with 10 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The extrudates were crushed and 40-60 mesh fraction was isolated by sieving. The material was then sulphided and tested using the Diesel test procedure D3.

COMPARATIVE EXPERIMENT C3

R3 Ni1W1, 90

50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). The suspension of the 2 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

EXAMPLE E6

Ni1W1 R3 HT125

The catalyst was prepared under autogenic pressure in an autoclave reactor heated with microwave radiation at a reaction temperature of 125° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 125° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

EXAMPLE E7

Ni1W1 R3 HT150

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

EXAMPLE E8

Ni1W1 R3 175

The catalyst was prepared under autogenic pressure in an autoclave reactor heated with microwave radiation at a reaction temperature of 175° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 10° C./min to 175° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3. Examples E6 to E8 show that hydrothermal conditions result in a pronounced improvement of the activity compared to reference catalyst C2 and to the same catalyst C3 not prepared under hydrothermal conditions.

COMPARATIVE EXPERIMENT C4

Ni1 Nb.025W.975 R3

48.7 g of tungstic acid $H_2WO_4$ (0.195 mole W) was slurried in one liter of water together with 23.5 g of nickel hydroxycarbonate $2NiCO_3*3Ni(OH)_2*4H_2O$ (0.2 mole of Ni) and 0.8 grams of niobic acid (0.005 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

COMPARATIVE EXPERIMENT C5

Ni1 Nb.05W.95 R3

47.4 g of tungstic acid $H_2WO_4$ (0.19 mole W) was slurried in one liter of water together with 23.5 g of nickel hydroxycarbonate $2NiCO_3*3Ni(OH)_2*4H_2O$ (0.2 mole of Ni) and 1.6 grams of niobic acid (0.01 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

COMPARATIVE EXPERIMENT C6

Ni1 Nb.075W.925 R3

46.2 g of tungstic acid $H_2WO_4$ (0.185 mole W) was slurried in one liter of water together with 23.5 g of nickel hydroxycarbonate $2NiCO_3*3Ni(OH)_2*4H_2O$ (0.2 mole of Ni) and 2.4 grams of niobic acid (0.015 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

EXAMPLE E9

Ni1 Nb.025W.975 HT150

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.87 grams of tungstic acid (0.0195 mole W) and 0.080 grams of niobic acid (0.0005 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

EXAMPLE E10

Ni1 Nb0.05W0.95 R3 HT150

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.74 grams of tungstic acid (0.019 mole W) and 0.16 grams of niobic acid (0.001 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

EXAMPLE E11

Ni1Nb0.075W0.925 R3 HT150

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.62 grams of tungstic acid (0.0185 mole W) and 0.24 grams of niobic acid (0.0015 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed- and 40-60 mesh fraction was isolated by sieving. The material was then calcined at 300° C. for 1 hour. The material was then sulphided and tested using the Diesel test procedure D3.

Examples E9 to E11 show a Niobium containing catalyst prepared in hydrothermal conditions not only has a significantly increased activity compared to non-hydrothermally prepared catalysts C4 to C6, but also a very pronounced unexpected improvement of activity compared to a catalyst prepared in the same condition without the small amount of Niobium.

COMPARATIVE EXPERIMENT C7

Ni1W1 R3, 7 days 50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). The suspension of the 2 solids was heated to 90° C. and held at that temperature for a period of 7 days with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3. The results show that at very long reaction times an improvement in activity could be obtained compared to 20 hours reaction time, but that this improvement is very small compared to the improvement obtained by the hydrothermal conditions.

EXAMPLE E12

Ni1.5W1 R3 HT150

The catalyst was prepared under autogenic pressure in an autoclave reactor heated with microwave radiation at a reaction temperature of 150° C. and reaction time of about 6 hours. 3.53 g of Ni carbonate (0.03 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3. The results show that in hydrothermal conditions very good results can be obtained at higher metal molar ratio, but that a higher metal molar ratio is not necessary or desirable.

COMPARATIVE EXPERIMENT C8

Ni0.9W1 R1 90

49.2 g of ammonium metatungstate (0.2 mole W) were dissolved in 800 ml of water giving a solution of a pH of about 5.2. To this solution, 0.4 moles of ammonium hydroxide (ca. 30 ml) was added, resulting in a pH increase to about 9.8. This solution was heated to 90° C. (solution A). A second solution was prepared by dissolving 52.4 g Ni nitrate hexahydrate (0.18 mole Ni) in 50 ml of water. The solution was maintained at 90° C. (solution B). Solution B was added dropwise to solution A at a rate of 7 ml/min. The suspension that formed was stirred for 30 minutes while the temperature was maintained at 90° C. The material was filtered hot and dried in air at 120° C. overnight. The obtained material was pelleted, the pellets were crushed and 40-60 mesh fraction was isolated by sieving. The material was then calcined at 300° C. for 1 hour. The material was then sulphided and tested using the Diesel test procedure D3.

EXAMPLE E13

Ni0.9W1 R1 HT150

The catalyst was prepared under autogenic pressure in an autoclave reactor heated with microwave radiation at a reaction temperature of 150° C. and reaction time of 30 minutes. To a solution of 10.48 g Ni nitrate hexahydrate (0.036 mole Ni) in 100 cc of water was added 9.86 g of ammonium metatungstate (0.04 mole W) and 6 ml of ammoniumhydroxide. The suspension was put into a sealed Weflon™ vessel of 275 cc total volume and heated at 10° C./min to 150° C. and held at that temperature for 30 minutes with continuous stirring. The sample was cooled to room temperature and the solid filtered, washed and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3. The results show that surprisingly also very good results can be obtained by reacting under hydrothermal conditions a reaction mixture wherein all components dissolved.

COMPARATIVE EXPERIMENT C9

Ni1W1 R2

49.2 g of ammonium metatungstate $(NH_4)_6H_2W_{12}O_{40}$ (0.2 mole W) were dissolved in 800 ml water, giving a solution with a pH of about 5.2 at room temperature. The solution was subsequently heated to 90° C. (solution A). 23.5 g of nickel hydroxycarbonate $2NiCO_3*3Ni(OH)_2*4H_2O$ (0.2 mole Ni) were suspended in 200 ml of water, and this suspension was heated to 90° C. (suspension B). Then suspension B was added to solution A in 10 minutes, and the resulting suspension was maintained at 90° C. for a period of 16 hours with continuous stirring. The resulting solid was dried at 120° C. for 16 hours (overnight). The resulting solid was pelleted, the pellets were crushed and 40-60 mesh fraction was isolated by sieving. The material was then sulphided and tested using the Diesel test procedure D3.

EXAMPLE E14

Ni1W1 R2 HT150

The catalyst was prepared under autogenic pressure in an autoclave reactor heated with microwave radiation at a reaction temperature of 150° C. and reaction time of about 6 hours. 3.52 g of Ni carbonate (0.03 moles Ni) was added to 150 cc of water along with 7.40 g of ammonium metatungstate (0.03 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3. The results show that surprisingly also very good results can be obtained by reacting under hydrothermal conditions a reaction mixture wherein one component is in solid form and the component is dissolved.

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested the catalysts were pre-sulphided via liquid phase presulphiding using the feed described in Table 1 which had been spiked with dimethyl disulfide to a total sulfur content of 3.7 wt. %. The pre sulphided catalysts were then tested in the hydrotreating of a diesel feedstock having the properties shown in Table 1:

TABLE 1

| GAS OIL FEEDSTOCK | |
|---|---|
| S (wt. %) | 1.2 |
| N (ppmwt) | 84 |
| total aromatics (wt. %) | 27.8 |
| polynuclear aromatic (PNA) (wt. %) | 11.7 |
| mono-aromatics (wt. %) | 16.5 |
| di-aromatics (wt. %) | 10.8 |
| tri+-aromatics (wt. %) | 0.8 |
| Simulated distillation ASTM-D 86 | |
| Initial boiling point | 184° C. |
| 5 vol. % | 218° C. |
| 10 vol. % | 231° C. |
| 30 vol. % | 265° C. |
| 50 vol. % | 287° C. |
| 70 vol. % | 310° C. |
| 90 vol. % | 345° C. |
| Final boiling point | 374° C. |

The catalysts were tested under the two conditions shown in Table 2:

TABLE 2

| | Presulfiding | Condition 1 | Condition 2 |
|---|---|---|---|
| Temperature (° C.) | 320 | 330 | 340 |
| Pressure (bar) | 40 | 40 | 20 |
| H2 to oil ratio (Nl/l) | 300 | 300 | 300 |
| LHSV (1/h) | 3.00 | 2.00 | 1.50 |

Diesel Test Procedure D2

The catalysts were tested as described in D1 except for another space velocity in the 1st condition shown in Table 3:

TABLE 3

| | Presulfiding | Condition 1 | Condition 2 |
|---|---|---|---|
| Temperature (° C.) | 320 | 330 | 340 |
| Pressure (bar) | 40 | 40 | 20 |
| H2 to oil ratio (Nl/l) | 300 | 300 | 300 |
| LHSV (1/h) | 3.00 | 1.50 | 1.50 |

Diesel Test Procedure D3

The catalyst was loaded into the reactor in a manner analogous to what is described in D1. Before being tested the catalysts were presulphided via liquid phase presulphiding using LGO feed described below in Table 5 which had been spiked with dimethyl disulfide to a total sulfur content of 3.7 wt. %. The presulphided catalysts were then tested in the hydrotreating of a diesel feedstock having the properties shown in Table 4:

TABLE 4

| GAS OIL FEEDSTOCK | |
|---|---|
| S (wt. %) | 1.1969 |
| N (ppmwt) | 102 |
| total aromatics (wt. %) | 28.3 |
| mono-aromatics (wt. %) | 16.5 |
| di-aromatics (wt. %) | 11.0 |
| tri+-aromatics (wt. %) | 0.8 |
| Simulated distillation ASTM-D 86 | |
| Initial boiling point | 178.4° C. |
| 5 vol. % | 211° C. |
| 10 vol. % | 224° C. |
| 30 vol. % | 261° C. |
| 50 vol. % | 283° C. |
| 70 vol. % | 309° C. |
| 90 vol. % | 348° C. |
| Final boiling point | 372° C. |

The catalysts were tested under the two conditions shown in Table 5:

TABLE 5

| | Presulfiding | Condition 1 | Condition 2 |
|---|---|---|---|
| Temperature (° C.) | 320 | 320 | 340 |
| Pressure (bar) | 45 | 45 | 20 |
| H2 to oil ratio (Nl/l) | 200 | 300 | 300 |
| LHSV (1/h) | 3.00 | 3.00 | 1.50 |

The full width at half maximum (FWHM) was measured for all examples and was found to be below 2.5 in all examples. The examples show that under hydrothermal conditions a highly active catalyst could be obtained even at group VIII to group VIB metal molar ratio below 1 where at normal atmospheric conditions no active catalyst could be obtained.

TABLE 6

Test results

| sample | test powder | test extrudates | CBD loaded | S1 ppm | S2 ppm | N2 ppm | RVA HDS1 | RVA HDS2 | RWA HDS1 | RWA HDS2 | RVA HDN2 | RWA HDN2 |
|---|---|---|---|---|---|---|---|---|---|---|---|---|
| C1.1 | Ni1Mo0.5W0.5 R3 crushed | D1 | | 1.21 | 4 | 21 | 5 | 100 | 100 | 100 | 100 | 100 | 100 |
| E1 | Ni0.75W1 R3 HT | D1 | | 1.63 | 3 | 13 | 3 | 114 | 126 | 85 | 93 | 115 | 86 |
| E2 | Ni1W1 R3 HT | D1 | | 1.73 | 3 | 8 | 2 | 113 | 155 | 79 | 108 | 130 | 91 |
| E5 | NiMo0.5W0.5 R3 HT | D1 | | 1.27 | 3 | 20 | 3 | 110 | 103 | 105 | 98 | 111 | 106 |
| C1.2 | Ni1Mo0.5W0.5 R3 | | D2 | 1.17 | 9 | 75 | 12 | 100 | 100 | 100 | 100 | 100 | 100 |
| E3 | Ni0.5W1 R3 HT | | D2 | 1.09 | 9 | 93 | 17 | 90 | 78 | 100 | 87 | 75 | 82 |
| E4 | Ni0.5W0.975Nb0.025 R3 HT | | D2 | 1.23 | 4 | 69 | 13 | 121 | 90 | 119 | 89 | 84 | 83 |
| C2 | Ni1Mo0.5W0.5 R3 | | D3 | 1.25 | 149 | 23 | 3.7 | 100 | 100 | 100 | 100 | 100 | 100 |
| C3 | Ni1W1 R3 90 | | D3 | 1.12 | 1591 | 206 | 29 | 26 | 36 | 31 | 44 | 38 | 46 |
| E6 | Ni1W1 R3 HT125 | | D3 | 1.64 | 16 | 9 | 1.3 | 279 | 147 | 216 | 114 | 125 | 97 |
| E7 | Ni1W1 R3 HT150 | | D3 | 1.72 | 9 | 9 | 1.4 | 347 | 151 | 259 | 113 | 130 | 97 |
| E8 | Ni1W1 R3 HT175 | | D3 | 1.75 | 6 | 8 | 1.2 | 420 | 150 | 311 | 111 | 127 | 94 |
| C4 | Ni1Nb0.025W0.975 R3 | | D3 | 1.05 | 1256 | 148 | 21 | 31 | 42 | 36 | 50 | 47 | 56 |
| C5 | Ni1Nb0.05W0.95 R3 | | D3 | 1.16 | 679 | 50 | 9 | 45 | 70 | 51 | 80 | 72 | 82 |
| C6 | Ni1Nb0.075W0.925 R3 | | D3 | 1.12 | 884 | 74 | 13 | 38 | 59 | 44 | 68 | 62 | 72 |
| E9 | Ni1Nb0.025W0.975 R3 HT150 | | D3 | 1.67 | 5 | 9 | 1.4 | 456 | 149 | 363 | 118 | 129 | 103 |

TABLE 6-continued

Test results

| sample | test powder | test extrudates | CBD loaded | S1 ppm | S2 ppm | N2 ppm | RVA HDS1 | RVA HDS2 | RWA HDS1 | RWA HDS2 | RVA HDN2 | RWA HDN2 |
|---|---|---|---|---|---|---|---|---|---|---|---|---|
| E10 | Ni1Nb0.05W0.95 R3 HT150 | D3 | 1.63 | 5 | 9 | 1.5 | 455 | 149 | 365 | 119 | 128 | 102 |
| E11 | Ni1Nb0.075W0.925 R3 HT150 | D3 | 1.72 | 9 | 11 | 1.3 | 346 | 137 | 270 | 106 | 133 | 103 |
| C7 | Ni1W1 R3 90 7 days | D3 | 1.51 | 67 | 17 | 2.9 | 148 | 112 | 124 | 93 | 102 | 85 |
| E12 | Ni1.5W1 R3 HT150 | D3 | 1.63 | 64 | 20 | 3.7 | 148 | 107 | 115 | 83 | 100 | 77 |
| C8 | Ni0.9W1 R1 | D3 | 2.5 | 851 | 86 | 8.1 | 40 | 54 | 21 | 28 | 73 | 38 |
| E13 | Ni0.9W1 R1 HT 150 | D3 | 1.92 | 15 | 14 | 2.3 | 287 | 119 | 192 | 79 | 109 | 73 |
| C9 | Ni1W1 R2 | D3 | 1.79 | 422 | 51 | 6.9 | 60 | 68 | 41 | 47 | 78 | 54 |
| E14 | Ni1W1 R2 HT 150 | D3 | 1.6 | 110 | 23 | 3.3 | 118 | 97 | 94 | 77 | 99 | 79 |

The invention claimed is:

1. A bulk catalyst comprising metal oxidic particles comprising one or more Group VIB metals and one or more Group VIII metals obtainable by a process comprising the steps of
   i) combining in a reaction mixture one or more first compounds comprising one or more Group VIII metals and one or more second compounds comprising one or more Group VIB metals in the presence of a protic liquid, wherein the Group VIII metals to Group VIB metals molar ratio is below 1, and
   ii) reacting the compounds under hydrothermal conditions at a reaction temperature above the boiling temperature of the protic liquid to form metal oxidic particles.

2. The bulk catalyst according to claim 1, wherein the reaction pressure is above atmospheric pressure.

3. The bulk catalyst according to claim 1, wherein the protic liquid is water and the reaction is done in hydrothermal conditions at a reaction temperature above 100° C. and a reaction pressure higher than 1 bar.

4. The bulk catalyst according to claim 1, wherein the one or more first metal compounds and the one or more second metal compounds remain at least partly in the solid state during the entire reaction.

5. The bulk catalyst according to claim 1, wherein the metal oxidic particles are dried and/or heat treated at a temperature below 375° C.

6. The bulk catalyst according to claim 1, wherein the reaction mixture comprises a Group V metal.

7. The bulk catalyst according to claim 1, wherein the metal oxidic particles comprise essentially one Group VIII metal, and essentially 2 Group VIB metals.

8. The bulk catalyst according to claim 1, wherein the metal oxidic particles comprise essentially one Group VIII metal, and essentially one Group VIB metal.

9. A sulphided bulk catalyst characterized in that it is a bulk catalyst according to claim 1 that has been sulphided.

10. A process comprising reacting a hydrocarbon feedstock in the presence of hydrogen at elevated temperatures and elevated pressures with the bulk catalyst or sulphided bulk catalyst according to claim 1.

11. A process for the manufacture of the bulk catalyst according to claim 1, comprising metal oxidic particles obtainable by the steps of:
   i) combining in a reaction mixture one or more first compounds comprising one or more Group VIII metals and one or more second compounds comprising one or more Group VIB metals in the presence of a protic liquid, wherein the Group VIII metals to Group VIB metals molar ratio is below 1, and
   ii) reacting the compounds under hydrothermal conditions at a reaction temperature above the boiling temperature of the protic liquid at a reaction pressure above atmospheric pressure, to form metal oxidic particles,
the process further optionally comprising one or more of the following process steps:
   iii) separating the metal oxidic particles from the reaction mixture,
   iv) compositing the metal oxidic particles with 0.1 to 40 wt % of one or more materials selected from the group of binder materials, conventional hydroprocessing catalysts, cracking compounds, acidic promoters or mixtures thereof before, during or after the combining and/or reacting of the metal compounds,
   v) spray-drying, (flash) drying, milling, kneading, slurry-mixing, dry or wet mixing, or combinations thereof,
   vi) shaping,
   vii) drying and/or thermally treating, and
   viii) sulphiding.

12. The process according to claim 11, wherein both the first and second metal compounds remain at least partly in the solid state during the entire reaction.

13. The process according to claim 12, wherein both the first and second metal compounds are free from nitrogen atoms and wherein protic liquid separated from the obtained metal oxidic particles after the reaction (step iii) is re-used at least in part to form the reaction mixture in step i).

* * * * *

UNITED STATES PATENT AND TRADEMARK OFFICE
CERTIFICATE OF CORRECTION

PATENT NO. : 8,394,263 B2
APPLICATION NO. : 12/091327
DATED : March 12, 2013
INVENTOR(S) : Eijsbouts-Spickova et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this
First Day of September, 2015

Michelle K. Lee
*Director of the United States Patent and Trademark Office*